Fig. 1.

PLAIN PELLET

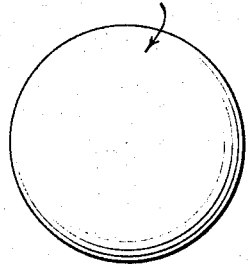

Fig. 2.

MEDICAMENT LAYER

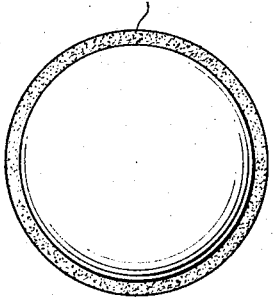

Fig. 3.

DUSTING POWDER PARTICLES

LEAFLETS OF FATTY ACID IMBEDDED OR INTERSPERSED WITH DUSTING POWDER PARTICLES AFTER ONE CHARGE

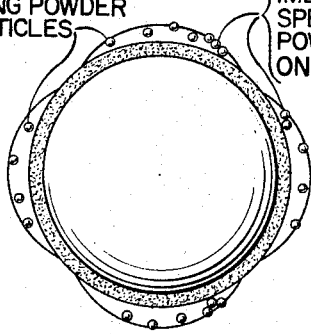

Fig. 4.

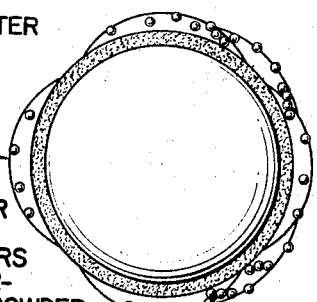

APPEARANCE AFTER 2 CHARGES NOTE OVERLAPPING LAYERS OF ACID WITH INTERSPERSED DUSTING POWDER PARTICLES STILL SOME UNCOVERED AREAS AND MANY CHANNELS

Fig. 5.

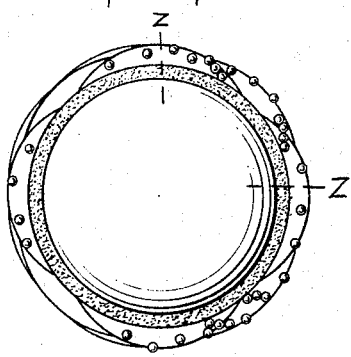

APPEARANCE AFTER 3 OR MORE CHARGES NO UNCOVERED AREAS CHANNELS MADE BY PARTICLES OF DUSTING POWDER WHICH TOUCH EACH OTHER. WEAK SPOTS IN FATTY ACID LAYER FORMED BY DUSTING POWDER PARTICLES IN CLOSE PROXIMITY.

Fig. 6.

ONLY ONE DIRECT CHANNEL SHOWN OTHERS INTERRUPTED BY LAYERS OF FATTY ACID

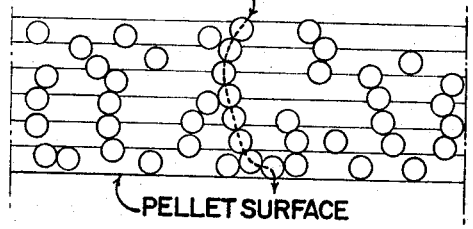

PELLET SURFACE

*INVENTOR.*
NORMAND E. BRINDAMOUR

BY Raymond Underwood

*ATTORNEY*

United States Patent Office 3,383,283
Patented May 14, 1968

3,383,283
MEDICINAL PELLETS COATED WITH OVERLAPPING POROUS FATTY ACID LEAFLET LAYERS
Normand E. Brindamour, Worcester Township, Montgomery County, Pa., assignor to Merck & Co., Inc., Rahway, N.J., a corporation of New Jersey
Continuation-in-part of application Ser. No. 262,373, Mar. 4, 1963. This application Jan. 24, 1964, Ser. No. 339,911
3 Claims. (Cl. 167—83)

ABSTRACT OF THE DISCLOSURE

Medicinal cores or pellets are tumbled over and over in a coating pan while applying to them alternately and repeatedly a stearic acid solution (for example) and talc (for example) to build up a coating which will cause prolonged time release of the medicine.

---

This application is a continuation-in-part of my co-pending now abandoned application Ser. No. 262,373, filed on Mar. 4, 1963 and having the title, "Pharmaceutical Preparations."

This invention relates in general to certain new and useful improvements in pharmaceutical preparations and, more particularly, to sustained release pharmaceutical preparations comprising coated pellets containing a drug or medicament. More particularly, the invention relates to an improved coating material used to prolong the release of a medicament upon oral administration, to medicaments coated with said material, and to methods of preparing same.

The sustained release coating of this invention provides satisfactory sustained release rates of medicament in the gastro-intestinal tract. It will be understood that this sustained release of medicament over a period of many hours differs from the result achieved with enteric coatings which protect the medicament during passage through the stomach and then releases all of the medicament at substantially one time.

The fatty acids have been suggested as enteric coatings for tablets and pills but because of their slow rate of solubility in the intestinal fluids, have found little use as such a coating. It has been found that when pills or tablets are coated with enough fatty acid to resist attack by gastric fluids they also in many cases resist attack by the intestinal fluids and pass through the body without releasing the active medicament. This invention relates to a manner of modifying the fatty acid so as to make it effective as a coating for pellets, a multitude of said pellets blended into a unit dosage form producing a prolonged and sustained release of the medicament in the alimentary tract.

Broadly speaking, the method of preparing the preparations of this invention comprises coating a medicament containing pellet with a plurality of charges of fatty acid followed by dusting with an inert fine insoluble powder. In practice this generally requires the formation of medicated beadlets, by coating small inert seed-like cores with the desired dosage of a medicament, and thereafter applying a plurality of charges of fatty acid as a melt or in solution to a batch of the medicated cores. Said charges may or may not be followed by an application of a fine inert dusting powder. This powder will serve as pores or channels thru which the drug will be released to the surrounding fluid environment and/or will serve as points of attack by the surrounding fluid environment on the coating.

The step of building up a medicament about a central inert core is well known to the art (see, for example, U.S. Patent No. 2,738,303). The novelty of this invention, however, resides in the improved coating material and the randomness of its application to the resulting medicated cores. Said coating material comprises the utilization of two components, to wit, mixtures of fatty acids and an inner dusting powder as more specifically described hereinafter. The fatty acid mixture, which is preferably applied in solution with an inert volatile organic solvent (but which may also be applied as a melt) modified by the dusting powder which serves to form channels or weak spots in the fatty acid layer thereby regulating the release of medicament to the surrounding fluid environment serves to resist the action of the gastro-intestinal fluids for a determined period of time. Some pellets will release the drug rapidly, some at a slower rate and still others at a delayed time. It is to be understood that not all pellets release the drug at the same rate. It is in fact the randomness of the coating and sampling which gives the product the sustained release qualities desired. It was shown experimentally that pellets coated with a continuous, complete envelope of fatty acid did not exhibit the sustained release qualities desired but that the action was a delayed one and often incomplete.

For a more detailed explanation of the invention reference is made to FIGURES I to VI. FIGURE I graphically represents the pellet as a sphere although in reality they are not all perfect spheres but rather a variety of spheroidal forms. FIGURE II represents the pellet to which the medicament has been applied. The medicament is here represented as continuous but not uniform in thickness. In reality the medicament is deposited with some randomness which tends to accent the spheroidal nature of the pellets. FIGURE III represents the pellet after one charge of fatty acid and talc. The coating is deposited at random in leaflets over the surface of the medicated pellet and there are uncoated exposed areas on the pellet surface. Particles of talc are shown imbedded in the fatty acid leaflet and also adhering on the surface of the same leaflet. FIGURE IV represents the pellet after two charges of coating materials. It will be noticed that the pellet surface is more completely coated by the effect of the overlapping leaflets but that there are still exposed surface areas. Some particles of talc protrude thru the whole leaflet thickness whereas others just adhere to the surface. FIGURE V section Z—Z represents the pellet after a series of charges from two to thirty. The number of weak spots or continuous channels varies inversely with the number of charges applied. Note: One application is known as a charge in the industry i.e. if we apply 100 ml. to a batch then allow time for some phenomenon to occur before we make another application, this is called a "charge." FIGURE VI shows an enlarged section Z—Z of the surface area. Depicted here are six layers of fatty acid interspersed with dusting powder particles. These six layers may be the result of six or many more than six charges because of the uneven deposition of the fatty acid-powder layers. Note that as the layers increase the number of direct channels formed by the imbedded dusting particles decrease. Shown is only one direct channel to the surface from twelve in the first layer.

It is to be understood that the procedure will produce coated pellets wherein the coating on the individual pellet is not uniform and that the thickness of the coating may or may not vary at different points on the pellet surface. The ratio of dusting powder to fatty acid per unit volume of coating may vary in different sections of coating on the individual pellet. The dusting powder particles will orient themselves at random so as to create continuous and interrupted channels thru the coating layer again in a manner that some sections of the film will contain more channels than other sections on the same pellet.

It is also to be understood that the nature of the coating will vary from pellet to pellet within the same batch. Some pellets will have more direct and continuous channels formed by the orientation of the powder particles than other pellets. The same dusting powder will create weak spots in the coating of some pellets and none in others.

It has been shown that because of the randomness and the large population of pellets per unit dose that the release rate of the medicament can be controlled within finite limits i.e. reproducibility can be obtained from batch to batch and from samples within a batch.

The rate of release of medicament from a particular dose can be controlled by:

(a) Varying the relative solubility of the drug
(b) Varying the drug concentration per pellet
(c) Varying the number of pellets (population) per unit dose
(d) Varying the number of charges
(e) Varying the thickness of the coating
(f) Varying the dusting powder fatty acid ratio
(g) Varying the characteristics of the fatty acid
(h) Varying the characteristics of the dusting powder
(i) Blending two or more batches of pellets with different release rates.

In accordance with this invention, the mixtures of fatty acids may be composed of acids which have from 12 to 22 carbon atoms, such as for example, lauric, myristic, palmitic, stearic, arachidic and behenic acids, the preferred being a mixture of stearic acid forty to sixty parts by weight and palmitic acid sixty to forty parts by weight. Small amounts of other saturated or unsaturated fatty acids such as myristic or oleic may be incorporated. Stearic acid triple-pressed U.S.P. (XVI edition) is a typical example of such a combination of acids and is the preferred material. The triple pressed stearic acid which may be used is also defined under Stearic Acid on page 976 of the Merck Index, seventh edition. Due to their liquid nature, the use of corresponding unsaturated fatty acids alone are not suitable herein, although mixtures of saturated and unsaturated acids, wherein the mixture consists of up to 15% and preferably up to 10% of the latter, are advantageous.

In preparing the fatty acid coating solutions, the solvent must be inert to the particular medicament utilized and it must not be highly toxic or at least any minute residue which might be left after evaporation should not be highly toxic since, obviously, the finished preparation is meant to be ingested. Volatility is important, since it is not practical to utilize a solvent that requires an excessive drying or evaporating temperature. For practical purposes, it is desirable to effect the drying after each application at temperatures not substantially in excess of 50° C. Preferably, the inert volatile organic solvent should have a boiling point not greatly in excess of 100° C. and preferably below 100° C. Among the inert volatile organic liquids that are operable herein are aliphatic alcohols such as methanol, ethanol, isopropanol and the like; aromatic hydrocarbons such as benzene, toluene, xylene and the like; halogenated aliphatic hydrocarbons such as chloroform, carbon tetrachloride, 1,1,1-trichloroethane and the like; esters such as ethyl acetate, amyl acetate and the like; aliphatic hydrocarbons such as petroleum ether, hexane and the like; aliphatic ketones such as acetone, methyl ethyl ketone, diethyl ketone and the like; and mixtures of any of the foregoing. Solvent mixtures that have been found to be particularly suitable are alcohol-chloroform and alcohol-carbon tetrachloride mixtures in the range of from 40–60 to 60–40 percent by volume.

The fatty acid solution should be of a concentration that it is readily sprayable. It should not be so concentrated (with a resulting rapid deposition of coating) that only a comparatively small portion of the pellet surface is coated thereby resulting in relatively thick local layers nor should it be so dilute that the spray cycle is lengthened to such a point that the pellet is homogeneously enveloped in one continuous film of uniform thickness. It is in effect, the discontinuous and heterogeneous nature of the coating abetted by channels formed by the particles of dusting powder which give the product its sustained release characteristics. The fatty acid may be applied by conventional pouring techniques if special care is taken or it may be applied as a spray of the melt using specialized spraying equipment. In either case, special equipment and techniques are required along with rigid controls which make the procedure a difficult one. The preferred method of application is to spray a fatty acid solution in a suitable solvent at ordinary ambient temperatures. It has been found that, for practical purposes, the concentration of fatty acid in the coating solution may advantageously range from 5 to 50 percent by weight although concentrations of from 10 to 35 percent are preferred. The coating solution upon evaporation of the solvent, leaves fatty acid layers ranging from 0.5 to 50 microns in thickness.

The particle size of the coating powder is preferably of from 10 to 100 microns, although from 0.5 to 150 microns may advantageously be utilized. Theoretically, the thickness of the coated layers after each charge will be the thickness of the fatty acid layers plus the particle size of the dusted powder but in actual practice, the depth of the layers that are generally utilized are those thicknesses varying on different sections of the pellet resulting from the natural adherence of the dusting powder to the surface or its imbedding into the fatty acid layer by pressures exerted from the weight of the other pellets in the batch. Although talc is preferred, other typical inert coating powders that are operable herein are finely powdered kaolin, silica gel, diatomaceous earth, precipitated chalk and the like, including mixtures thereof.

The following procedure is illustrative of the present invention:

A weighed quantity of more or less spherical, inactive, seed-like cores are placed in a coating pan and the pan set in motion. Typical of the inert cores contemplated herein are those small sugary confectionary seeds, commonly known as non-pareil seeds (sugar pellets), which are so often used to decorate cakes, candies, and the like. These seeds may be white or colored, are substantially spherical, and may advantageously range from 12 to 40 mesh in size although from 15 to 30 mesh are preferred. Other inert cores that are operable herein are those described in U.S. Patent 2,809,918. The inactive cores are coated with successive charges of a drug or medicament until the desired dosage has been incorporated in the batch. This step may be accomplished by wetting the surfaces of the inactive cores with a solution of a measured quantity of the medicament in a suitable inert volatile solvent. Alternatively, the inactive cores may be wetted in the conventional manner using a binder prior to treatment with the medicament, in which case, the medicament may be either in solution or powder form. Typical of the binders contemplated herein are water, syrup (U.S.P.) and gelatin coating solutions such as one having the formula:

| | Parts by weight |
|---|---|
| Sucrose | 100 |
| Gelatin | 8 |
| Acacia | 6 |
| Water | 70 |

In either case, the moist medicated cores are dried, for example, in a current of warm air, and the procedure repeated until the desired amount of the medicament is built up around the central inactive core. Then, a weighed quantity of the medicament-containing pellets are placed in another rotating coating pan (any coating procedure known to the art may be used such as fluidized bed or air suspension process) and a plurality of charges of a fatty acid and an inert coating powder are applied thereon. Preferably, the fatty acid is gradually applied by spraying a solution of the fatty acid dissolved in a suitable inert volatile organic solvent onto the rolling medicated pellets. Thereupon, a quantity of coating powder is introduced slowly into the pan to dust the wet surfaces of the pellets. If necessary, any excess coating powder may be removed by conventional methods, such as by screening, blowers, or vacuum techniques. The solvent is then evaporated and the pellets dried. This procedure is repeated until the desired number of charges of fatty acid and coating powder have been applied. If desired, the release rate of the medicament may be adjusted by applications of more than one coating of fatty acid prior to dusting with the coating powder. Advantageously, the total fatty acid-inert powder coating may constitute at least 2% by weight of the finished coated pellets, although from 5 to 25% is preferred.

If desired, the coated pellets can be trimmed up and made to appear more pharmaceutically elegant by applying a conventional outer coating of colored sugar glaze or by omitting an application of coating powder after the final application of fatty acid coating solution, or by incorporating soluble colors.

The subject invention is useful with any medicament or combination of medicaments which it is desired to provide in sustained release form. Thus, for example, the medicament may be a hormone, enzyme, vasoconstrictive amine, alkaloid, steroid, analgesic, bronchodilator, antihistamine, antitussive, antibiotic, diuretic, sulfonamide, sympathomimetic, barbiturate, and the like, and synergistic combination of these. Also suitable are salts, esters, complexes, and other derivatives of these medicaments. Typical examples of the medicaments which may be employed are: dexamethasone, prednisolone, isoproterenol, codeine, atropine, scopolamine, hyoscyamine, morphine, penicillin, streptomycin, tetracycline, chlorotetracycline, cortisone, hydrocortisone, cyproheptadine hydrochloride, hydrochlorothiazide, chlorothiazide, dextroamphetamine sulfate, racemic amphetamine sulfate, chloroprophenpyridamine maleate, phenobarbital, barbital, amobarbital, etc. Various extenders and fillers which are conventionally used may also be admixed with the medicament when desired. It has been found that this invention is particularly useful for those medicaments whose water solubility does not exceed 20 percent and, preferably, does not exceed 10 percent. When the solubility exceeds 20 percent, it may be necessary to make a less soluble derivative such as, for example, by making a salt, ester, complex or some other derivative which is less soluble.

For administration purposes, the pellets are preferably encapsulated in two-piece gelatin capsules in dosage unit form, each dosage providing for a sustained release of the medicament over a long period of time, for example, from 2 to 8 hours. The pellets may be employed alone or in combination with coated or uncoated pellets or granules of other therapeutic substances. In those cases where an initial immediately released dosage is necessary, the coated medicament-containing pellet of this invention may be admixed with a predetermined amount of uncoated medicament-containing pellets so that, upon ingestion, the medicament may be brought up to the desired therapeutic level promptly in conjunction with a gradual release thereafter of uniform amounts of the medicament to sustain the therapeutic level, which gradual release may be controlled by a predetermined blending of two or more fractions of medicated pellets that have been coated with varying numbers of the subject fatty acid and coating powder applications.

Accordingly, the subject invention affords a pharmaceutical preparation providing a prolonged release of the contained medicament in the gastro-intestinal tract which comprises a medicament protected by a coating comprising of mixtures of fatty acids having from 12 to 22 carbon atoms interspersed with an inert fine coating powder.

The following examples illustrate methods of carrying out the present invention but it is to be understood that these examples are given for purposes of illustration and not of limitation.

*Example 1*

(A) Seventeen kilograms of 25–30 mesh non-pareil seeds (sugar pellets) are placed in a 30-inch coating pan. One-hundred twenty mls. of a 42.5% sucrose solution in water are sprayed on the pellets while tumbling in the coating pan. Immediately following, 345 mls. of a methanol solution containing 0.25% dexamethasone are slowly poured onto the moist rolling pellets. The pellets are then allowed to dry in warm air. The procedure is repeated seventeen times until 2,040 mls. of the sucrose solution and 5,865 mls. of the dexamethasone solution have been applied.

(B) Fifteen kilograms of the dexamethasone coated pellets are transferred to a 30-inch coating pan and agitated. Five-hundred mls. of a solution prepared from 640 gms. of triple pressed stearic acid (U.S.P. XVI) and 1,920 mls. of chloroform (U.S.P.) made up to a volume of 4,000 mls. with anhydrous alcohol are sprayed onto the rolling pellets. Two-hundred fifty grams of talc (U.S.P) are dusted through cheesecloth onto the moist rolling pellets. The pellets are allowed to dry while rolling. The procedure is repeated eight times until 4,000 mls. of the stearic acid solution and 2,000 gms. of talc have been applied.

(C) A release pattern is conducted on a 200 mg. portion of the dexamethasone pellets coated as in (B), and equivalent to 1.26 mgs. of dexamethasone, according to the method described by Souder and Ellenbogen in Drug Standards, vol. 26, No. 3, pp. 77–83 (1958). The simulated gastric fluid consisted of 7 mls. of concentrated hydrochloric acid diluted to 1 liter with distilled water. The simulated intestinal fluid consisted of 1.5% sodium bicarbonate solution. The following results are obtained:

| Time (hrs.) | Test Fluid | Milligrams Released | Cumulative Release (mg.) | Cumulative Percent Released |
|---|---|---|---|---|
| ½ | Gastric | .118 | .118 | 9.3 |
| 1½ | do | .155 | .273 | 21.6 |
| 2 | Intestinal | .387 | .660 | 52.2 |
| 4½ | do | .426 | 1.086 | 85.8 |
| 7 | do | .130 | 1.216 | 96.1 |

(D) A similar release pattern, conducted on a 250 mg. portion of a mixture of pellets equivalent to 0.275 mg. of dexamethasone in the form of the above uncoated (A) pellets, 0.550 mg. of dexamethasone in the form of the above stearic acid-talc coated (B) pellets, plus placebos, yielded the following results:

| Time (hrs.) | Test Fluid | Milligrams Released | Cumulative Release (mg.) | Cumulative Percent Released |
|---|---|---|---|---|
| ½ | Gastric | .301 | .301 | 36.4 |
| 1½ | do | .090 | .391 | 47.4 |
| 2 | Intestinal | .168 | .559 | 67.8 |
| 4½ | do | .173 | .732 | 88.7 |
| 7 | do | .007 | .739 | 89.5 |

*Example 2*

(A) One kilogram of 25–30 mesh non-pareil seeds are placed in a 10-inch coating pan and agitated. A mixture of 176 grams of cyproheptadine tannate and 88 grams of starch (U.S.P.) are applied to the seeds using an aqueous 64% sucrose solution as a binder. After applying 20 mls. of the sucrose solution, 5 grams of the above mixed powders are dusted onto the rolling pellets. The pellets are allowed to dry and the procedure is repeated four times. An additional 20 applications are made, each consisting of approximately 30 mls. of syrup and 12 grams of mixed powders.

(B) One kilogram of the above cyproheptadine tannate coated pellets are transferred to a 10-inch coating pan and agitated. The pellets are coated with 20 applications of triple pressed stearic acid (S.A.) and 10 applications of talc (U.S.P.)T by repeating the following sequence ten times:

Step 1—S.A.—T—air dried
Step 2—S.A.—air dried

Each application of stearic acid consists of 34 mls. of a 16% stearic acid solution in 40% v./v. anhydrous alcohol and 60% v./v. chloroform and each application of talc equalled 17 grams.

(C) According to the procedure outlined in Example 1 (C), a release pattern is conducted on a 20 mg. portion of cyproheptadine tannate pellets, coated as in (B) and equivalent to 5.67 mgs. of cyproheptadine. The following results are obtained:

| Time (hrs.) | Test Fluid | Milligrams Released | Cumulative Release (mg.) | Cumulative Percent Released |
|---|---|---|---|---|
| ½ | Gastric | 0.86 | 0.86 | 15 |
| 1½ | ___do___ | 0.69 | 1.55 | 27 |
| 2 | Intestinal | 0.20 | 1.75 | 31 |
| 4½ | ___do___ | 2.08 | 3.83 | 68 |
| 7 | ___do___ | 1.22 | 5.05 | 89 |

(D) A similar release pattern, conducted on a 250 mg. portion of a mixture of pellets containing the equivalent of 1 mg. of cyproheptadine in the form of the above uncoated (A) pellets, 3 mgs. of cyproheptadine in the form of the above stearic acid-talc coated (B) pellets, plus placebos, yielded the following results:

| Time (hrs.) | Test Fluid | Milligrams Released | Cumulative Release (mg.) | Cumulative Percent Released |
|---|---|---|---|---|
| ½ | Gastric | 1.45 | 1.45 | 36 |
| 1½ | ___do___ | 0.36 | 1.81 | 45 |
| 2 | Intestinal | 0.12 | 1.93 | 48 |
| 4½ | ___do___ | 1.11 | 3.04 | 76 |
| 7 | ___do___ | 0.63 | 3.67 | 92 |

*Example 3*

(A) Six hundred grams of 25–30 mesh non-pareil seeds are placed in an 8-inch coating pan, agitated and 70 grams of amitriptyline pamoate are applied to the seeds by the following procedure. Ten mls. of a 42.5% sucrose solution in water are sprayed onto the tumbling pellets. Five grams of amitriptyline pamoate are then dusted onto the moistened pellets. The pellets are allowed to dry and the procedure is repeated until the 70 gms. of amitriptyline pamoate have been applied.

(B) Seven hundred grams of the amitriptyline pamoate coated pellets are transferred to an 8-inch coating pan and agitated. Using the procedure described in the previous examples, the pellets are coated with stearic acid U.S.P. triple pressed and talc according to the outline shown below. Each application of stearic acid (S.A.) consists of 24 mls. of a 16% solution of stearic acid in a mixture of 40% v./v. anhydrous alcohol and 60% v./v. chloroform. Each of the dusting powder applications consists of 12 gms. of talc (T).

(1) S.A.—T—air dried      (6) S.A.—air dried
(2) S.A.—T—air dried      (7) S.A.—T—air dried
(3) S.A.—T—air dried      (8) S.A.—air dried
(4) S.A.—T—air dried      (9) S.A.—T—air dried
(5) S.A.—T—air dried      (10) S.A.—air dried (C) According to the procedure outlined in Example 1 (C), a release pattern is conducted on a 200 mg. portion of the amitriptyline pamoate pellets, coated as in (B), equivalent to 9.50 mgs. of amitriptyline base. The following results are obtained:

| Time (hrs.) | Test Fluid | Milligrams Released | Cumulative Release (mg.) | Cumulative Percent Released |
|---|---|---|---|---|
| ½ | Gastric | 0.89 | 0.89 | 9.4 |
| 1½ | ___do___ | 0.98 | 1.87 | 19.7 |
| 2 | Intestinal | 0.94 | 2.81 | 29.5 |
| 4½ | ___do___ | 3.34 | 6.15 | 64.8 |
| 7 | ___do___ | 1.82 | 7.97 | 84.1 |

(D) A similar release pattern, conducted on a 500 mg. portion of a mixture of pellets equivalent to 10 mgs. of amitriptyline base in the form of the above uncoated (A) pellets, 15 mgs. of amitriptyline base in the form of the above stearic acid-talc coated (B) pellets, and placebos, yielded the following results:

| Time (hrs.) | Test Fluid | Milligrams Released | Cumulative Release (mg.) | Cumulative Percent Released |
|---|---|---|---|---|
| ½ | Gastric | 11.41 | 11.41 | 46.5 |
| 1½ | ___do___ | 1.54 | 12.95 | 51.8 |
| 2 | Intestinal | 1.48 | 14.43 | 57.7 |
| 4½ | ___do___ | 5.29 | 19.72 | 78.8 |
| 7 | ___do___ | 2.90 | 22.62 | 90.4 |

*Example 4*

(A) 500 grams of 25–30 mesh non-pareil seeds are placed in an 8-inch coating pan and agitated. 20 milliliters of syrup (U.S.P.), are sprayed onto the tumbling pellets. Immediately following, 25 gms. of an 80/20 powdered mixture of d-amphetamine sulfate/calcium sulfate are dusted onto the moistened pellets. The pellets are then allowed to dry in warm air. The procedure is repeated 4 times until 100 grams of the d-amphetamine sulfate/calcium sulfate mixture have been applied. Thereafter, 25 mls. of syrup are sprayed onto the pellets, 25 grams of talc are dusted thereon, and the pellets are air-dried.

(B) 600 grams of the above pellets are transferred to a dry coating pan, agitated, and sprayed with 35 mls. of a 16% triple pressed stearic acid U.S.P. solution (60–40 v./v. carbon tetrachloride-alcohol) and dusted with 20 gms. of talc. The pellets are allowed to dry in a current of warm air while rolling and the stearic acid-talc applications are repeated fifteen times.

(C) A release pattern is conducted on a 2.5 gm. portion of the d-amphetamine sulfate/calcium sulfate pellets, coated as in (B) and equivalent to 160.5 mgs. of d-amphetamine sulfate, according to the method and apparatus described by Nash and Marcus in Drug Standards, vol. 28, No. 1, pp. 1–5 (1960). The simulated gastric fluid consisted of 7 mls. of concentrated hydrochloric acid diluted to 1 liter with distilled water. The simulated intestinal fluid consisted of 1.5% sodium bicarbonate solution. The following results are obtained:

| Time (hrs.) | Cumulative percent released |
|---|---|
| ½ | 26 |
| 1½ | 31.1 |
| 2 | 33.7 |
| 3 | 56.7 |
| 4 | 68 |
| 5 | 80 |
| 6 | 85 |
| 7 | 88 |
| 8 | 93.5 |

*Example 5*

(A) Two kilograms of 25–30 mesh non-pareil seeds rolling in an 18-inch coating pan are moistened with 80 mls. of syrup (U.S.P.). Immediately following, 100 grams of a powdered mixture of d-amphetamine sulfate (80 gms.) and calcium sulfate (20 gms.) are dusted onto the seeds. The pellets are then dried in warm air. Four such charges of syrup and medicament are applied and this is followed by 80 mls. of syrup and 20 gms. of talc as a finish. The pellets are then air-dried.

(B) Seven hundred gms. of the above (A) seeds are coated with small increments of a 16% triple pressed stearic acid U.S.P. solution (60–40 v./v. carbon tetrachloride-alcohol) and small increments of talc, according to the table below, so that a total of 14.4 gms. of stearic acid and 24 gms. of talc are applied. The coated pellets are then allowed to air dry.

| Application No.: | Stearic Acid Soln. (mls.) | Talc (gms.) |
|---|---|---|
| 1 | 24 | 12 |
| 2 | 24 | 0 |
| 3 | 24 | 12 |
| 4 | 18 | 0 |

(C) Seven hundred gms. of the above (A) seeds are coated with small increments of a 16% triple pressed stearic acid U.S.P. solution (60–40 v./v. carbon tetrachloride-alcohol) and small increments of talc, according to the table below, so that a total of 28.8 gms. of stearic acid and 72 gms. of talc are applied. The coated pellets are then allowed to air dry.

| Application No.: | Stearic Acid Soln. (mls.) | Talc (gms.) |
|---|---|---|
| 1 | 24 | 0 |
| 2 | 24 | 12 |
| 3 | 24 | 12 |
| 4 | 24 | 12 |
| 5 | 24 | 12 |
| 6 | 24 | 12 |
| 7 | 24 | 12 |
| 8 | 12 | 0 |

(D) Seven hundred gms. of the above (A) seeds are coated with small increments of a 16% stearic acid solution (60–40 v./v. carbon tetrachloride-alcohol) and small increments of talc, according to the table below, so that a total of 43.2 gms. of stearic acid and 120 gms. of talc are applied. The coated pellets are then allowed to air dry.

| Application No.: | Stearic Acid Soln. (mls.) | Talc (gms.) |
|---|---|---|
| 1 | 24 | 0 |
| 2 | 24 | 12 |
| 3 | 24 | 12 |
| 4 | 24 | 12 |
| 5 | 24 | 12 |
| 6 | 24 | 12 |
| 7 | 24 | 12 |
| 8 | 24 | 12 |
| 9 | 24 | 12 |
| 10 | 24 | 12 |
| 11 | 24 | 12 |
| 12 | 6 | 0 |

(E) The above fractions are blended as follows:

|  | Milligrams |
|---|---|
| Fraction A | 274 |
| Fraction B | 413 |
| Fraction C | 440 |
| Fraction D | 476 |

The blend, which is found to be equivalent to 150 mgs. of d-amphetamine sulfate, exhibits the following release pattern when tested according to the Nash-Marcus technique:

| Time (hrs.) | Cumulative percent released |
|---|---|
| ½ | 25 |
| 1½ | 35 |
| 2 | 39 |
| 3 | 51 |
| 4 | 67 |
| 5 | 86 |
| 6 | 95 |
| 7 | 96 |
| 8 | 100 |

*Example 6*

(A) Eight hundred grams of 18–20 mesh non-pareil seeds rolling in a 12-inch coating pan are coated with hydrochlorothiazide using syrup (U.S.P.) as a binder. The syrup is sprayed onto the pellets in 25 ml. charges followed by 50 gms. of hydrochlorothiazide dusted thereon until a total of 500 mls. of syrup and 950 gms. of hydrochlorothiazide have been applied. The last charge of syrup is dusted with 20 gms. of talc. The seeds are air-dried and sieved to obtain pellets of 12–14 mesh for further overcoating.

(B) 450 grams of the above 12–14 mesh (A) seeds are coated with one application comprising 30 mls. of stearic acid solution and 3 gms. of talc. The stearic acid solution is a 16% v./v. solution of stearic acid made from 100 gms. of triple pressed stearic acid U.S.P., 200 mls. of anhydrous alcohol and 300 mls. of carbon tetrachloride. The coated pellets are allowed to air dry.

(C) 450 grams of the above 12–14 mesh (A) seeds are coated with two applications comprising 30 mls. of stearic acid solution and 3 gms. of talc per application. The coated pellets are allowed to air dry.

(D) 450 grams of the above 12–14 mesh (A) seeds are coated with three applications comprising 30 mls. of stearic acid solution and 3 gms. of talc per application. The coated pellets are allowed to air dry.

(E) Equal parts of pellets from (A), (B), (C) and (D) are blended and a 106 gm. portion of the blend, equivalent to 600 mgs. of hydrochlorothiazide, when tested according to the Nash-Marcus technique, exhibits the following release pattern:

| Time (hrs.) | Cumulative percent release |
|---|---|
| ½ | 39 |
| 1½ | 56 |
| 2 | 65 |
| 3 | 84 |
| 5 | 95 |
| 7 | 96 |

*Example 7*

The process of Example 1 is carried out by replacing the triple pressed stearic acid with a mixture of two parts triple pressed stearic acid and one part reagent grade stearic acid.

*Example 8*

The process of Example 5 is carried out by replacing the triple pressed stearic acid with a mixture of fifty parts commercially pure myristic acid and fifty parts reagent grade palmitic acid.

*Example 9*

The process of Example 5 is carried out by replacing the triple pressed stearic acid with one part reagent grade myristic acid and three parts triple pressed stearic acid.

*Example 10*

The process of Example 5 is carried out by replacing the triple pressed stearic acid with a mixture of equal parts of reagent grade myristic acid, reagent grade palmitic acid and triple pressed stearic acid.

*Example 11*

The process of Example 5 is carried out by replacing the triple pressed stearic acid with the following reagent grade acids: 52 parts palmitic, 44 parts stearic, 2 parts margaric and 2 parts myristic.

I claim:
1. A pharmaceutical preparation providing prolonged release of a drug in the gastro-intestinal tract comprising an orally administered disintegratable container, containing a multitude of small sugar/starch, substantially spherical confectionery non-pareil seeds ranging from 12 to 40 mesh in size, coated and built up with measured quantities of a medicament into medicinal pellets each coated with a plurality of overlapping porous fatty acid leaflet layers ranging from 0.5 to 50 microns in thickness, comprised of a mixture of fatty acids having from 12 to 22 carbon atoms alternated with a plurality of charges of an inert talc or other insoluble dusting powder in 0.5 to 150 micron particle size which serves to form pores, channels and weak spots in the otherwise continuous coating, the total fatty acid-inert insoluble dusting powder coating constituting at least 2% to 25% by weight of the finished coated pellets.

2. The pharmaceutical preparation of claim 1 wherein the inert dusting powder is selected from the group consisting of finely powdered talc, kaolin, silica gel, diatomaceous earth, precipitated chalk and mixture thereof.

3. The pharmaceutical preparation of claim 1 wherein the fatty acid is Stearic Acid USP Triple-Press and the inert powder is talc.

References Cited

UNITED STATES PATENTS

| | | | |
|---|---|---|---|
| 2,076,112 | 4/1937 | Barker | 167—82 X |
| 2,262,087 | 11/1941 | Bartlett et al. | 167—82 |
| 2,738,303 | 3/1956 | Blythe | 167—82 |
| 2,809,918 | 10/1957 | Hermelin | 167—82 |
| 2,853,420 | 9/1958 | Lowey | 167—82 |
| 2,897,121 | 7/1959 | Wagner | 167—82 |
| 2,928,770 | 3/1960 | Bardani | 167—82 |
| 2,991,226 | 7/1961 | Miller et al. | 167—82 |
| 3,081,233 | 3/1963 | Enz et al. | 167—82 |

FOREIGN PATENTS 109,438   1/1940   Australia.

LEWIS GOTTS, *Primary Examiner.*

S. K. ROSE, *Assistant Examiner.*